US007293384B2

(12) United States Patent
Lewis

(10) Patent No.: US 7,293,384 B2
(45) Date of Patent: Nov. 13, 2007

(54) SERVICE HANG TAG

(75) Inventor: Mark W. Lewis, Greenville, SC (US)

(73) Assignee: Marjen, Inc., Greenville, SC (US)

(*) Notice: Subject to any disclaimer, the term of this patent is extended or adjusted under 35 U.S.C. 154(b) by 0 days.

(21) Appl. No.: 11/342,791

(22) Filed: Jan. 30, 2006

(65) Prior Publication Data

US 2006/0213104 A1 Sep. 28, 2006

Related U.S. Application Data

(63) Continuation-in-part of application No. 11/076,351, filed on Mar. 9, 2005, now Pat. No. 7,246,459.

(60) Provisional application No. 60/661,566, filed on Mar. 14, 2005.

(51) Int. Cl.

| | |
|---|---|
| ***G09F 3/10*** | (2006.01) |
| ***G09F 23/00*** | (2006.01) |
| ***B32B 9/00*** | (2006.01) |
| ***A44C 5/00*** | (2006.01) |
| ***B42D 15/00*** | (2006.01) |
| ***G09C 3/00*** | (2006.01) |
| ***A45C 11/32*** | (2006.01) |

(52) U.S. Cl. ............................ 40/673; 40/633; 40/637; 40/638; 40/665; 428/42.3; 428/40.1; 283/75; 283/80; 283/81; 206/38.1; 206/37; 206/37.6

(58) Field of Classification Search .................. 40/674, 40/6, 673, 299.01, 300, 665
See application file for complete search history.

(56) References Cited

U.S. PATENT DOCUMENTS

| | | | | |
|---|---|---|---|---|
| 2,578,548 | A * | 12/1951 | Histed | 40/665 |
| 3,318,354 | A * | 5/1967 | Borisof | 206/38.1 |
| 4,726,131 | A * | 2/1988 | Cass | 40/638 |
| 4,846,501 | A | 7/1989 | Del Grande | 282/9 R |
| 4,907,359 | A | 3/1990 | Berman | 40/299 |
| 5,782,497 | A | 7/1998 | Casagrande | 283/110 |
| 5,943,804 | A * | 8/1999 | Linquist et al. | 40/637 |
| 6,352,287 | B2 | 3/2002 | Casagrande | 283/81 |
| 6,352,608 | B1 | 3/2002 | Garden | 156/249 |
| 7,017,293 | B2 * | 3/2006 | Riley | 40/633 |
| 7,047,682 | B2 * | 5/2006 | Riley | 40/633 |
| 2003/0049404 | A1 * | 3/2003 | Mercer et al. | 428/42.3 |

* cited by examiner

*Primary Examiner*—Lesley D. Morris
*Assistant Examiner*—Syed A Islam
(74) *Attorney, Agent, or Firm*—Charles L. Schwab; Nexsen Pruet, LLC

(57) ABSTRACT

A vehicle identification and locator card for vehicle parking and servicing establishments includes an upper portion made of paper board and a lower portion made of synthetic paper. The outline of an ignition key tag is die cut in the lower synthetic paper portion, which retains its strength when wet. The lower portion has a backing of either a dry release laminate patch or a polyester reinforcing tape.

1 Claim, 6 Drawing Sheets

SERVICE HANG TAG

CROSS REFERENCE TO RELATED APPLICATION

This application is a continuation-in-part of U.S. non-provisional patent application Ser. No. 11/076,351 filed Mar. 9, 2005, now U.S. Pat. No. 7,246,459, for a Service Tag and applicant claims the benefit of U.S. provisional patent application, Ser. No. 60/661,566 filed Mar. 14, 2005 for a Service Hang Tag.

BACKGROUND OF THE INVENTION

Businesses concerned with parking or servicing vehicles have a problem of correlating the ignition key and the vehicle owner with a particular vehicle. Paper cards with three segments separated by perforations and carrying the same number have been provided so that one segment serves as a claim check, a second segment is placed in the vehicle and a third segment has a key ring stapled to it. A computer type multiple copy form with perforated tear-off strips has been proposed for correlation of ignition key, vehicle and customer which includes perforation lines permitting separation of the form into sections—one to be placed on the vehicle, one to be connected to the ignition key in some undisclosed manner and one to be given to the automobile owner as a claim check. It has been found that in inclement weather, the paper vehicle key tag can become wet; causing it to lose strength, thereby increasing the risk of it breaking and a consequential loss of the key.

BRIEF DESCRIPTION OF THE INVENTION

The upper segment, or segments of a multiple part automotive vehicle locator card are formed from a thick sheet of pliable paperboard material and the lower vehicle key tag segment is made of synthetic paper, which retains its strength when wet. A matching identification number is printed on all segments of the card. The segments are established by perforations or slits which permits the segments to be easily separated from one another. A large upper segment of the card includes a punched out hole and a slit from an edge of the card to the hole which permits the upper segment to be attached to the rear view mirror bracket of the vehicle. In a three segment card the second segment is a customer's claim check. The bottom segment of the card includes a synthetic paper portion in which a removable arrow shaped key tag is formed. The bottom segment is provided in two forms. In one form a narrow Mylar laminate in the form of an adhesive type reinforcing tape is placed on the back side of the bottom segment covering the entire length of the arrow shaped key tag and wide enough to cover the head of the arrow, the shank of the arrow and a round hole and a slot in the tail of the arrow. The outline of the arrow is defined by long cuts and short connectors punched through the synthetic paper and the reinforcing Mylar tape. The hole and slot in the tail are punched through the synthetic paper and through the Mylar laminate. In the other embodiment, a strip of clean release adhesive tape is applied across the bottom segment completely covering the back side of the arrow and the outline of the arrow is cut through the synthetic paper but not through the clean release tape. The hole and the slot in the tail of the arrow are cut through both the synthetic paper and through the clean release tape. Upon removal of the key tag, the head of the arrow is inserted into a T-shaped slot in the tail of the arrow to form a ring for holding an ignition key. The synthetic paper of which the key tag is formed does not lose its strength upon becoming wet, thereby greatly reducing the risk of loss of the key. The Mylar tape additionally strengthens the key tag.

BRIEF DESCRIPTION OF THE DRAWINGS

Two embodiments of the invention are illustrated in the accompanying drawings in which.

DETAILED DESCRIPTION OF THE INVENTION

Figure 1:
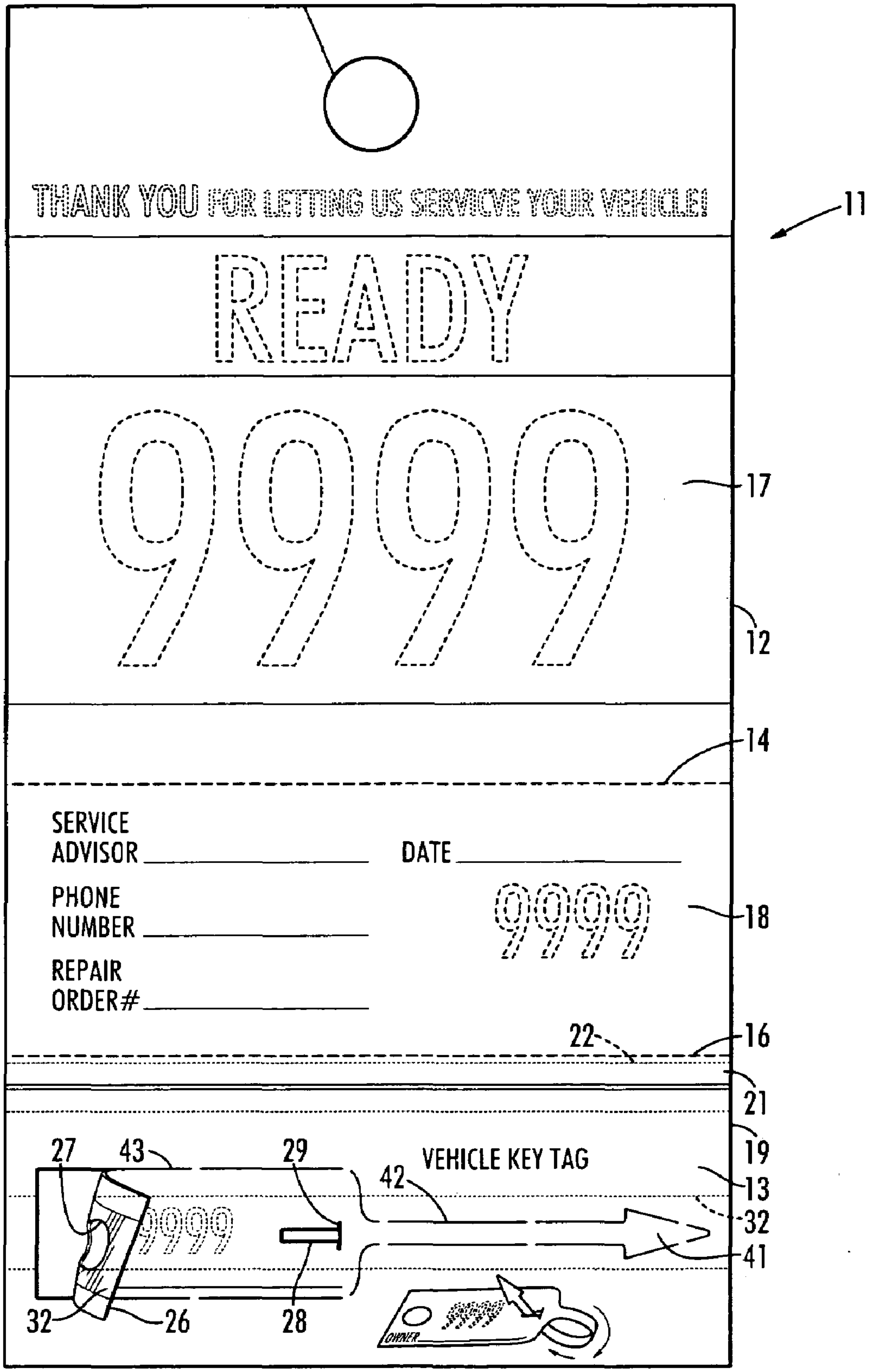
FIG. 1 shows the front of a first embodiment of a vehicle locator and identification card.

The automotive vehicle locator card 11 shown in FIG. 1 includes a relatively thick pliable paperboard sheet 12, forming an upper portion, and a lower portion 13 made of synthetic paper. The paperboard sheet 12 is perforated by cuts, or die cut substantially through its thickness, along lines 14, 16 thereby defining and permitting easy separation of three segments 17, 18, 19 of the card 11. The upper segment 17 is attachable to a vehicle. The intermediate segment 18 is the customer's claim check with customer satisfaction question on its back side. The lower segment 19 includes a narrow bottom part 21 of the paperboard sheet 12 and the lower portion 13 made of synthetic paper, such as 5 SPW Spectralite synthetic paper made by Multi-Plastics, Inc. of Lewis Center, Ohio, USA. 5 SPW spectralite synthetic paper is polypropylene film reinforced with other fillers to enhance the white, opaque surface.

Figure 2:
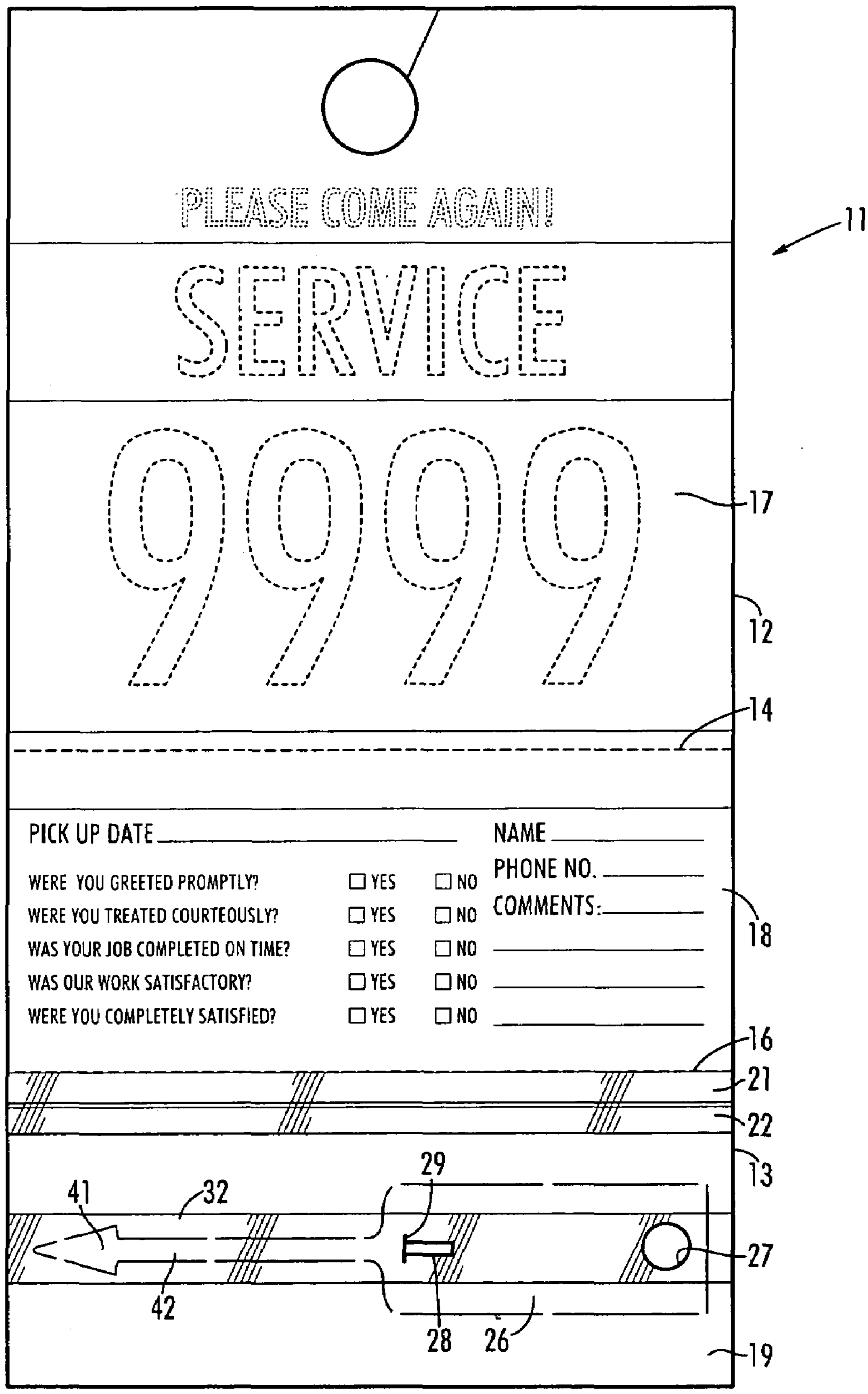
FIG. 2 shows the rear of the card shown in FIG. 1.

As shown in FIGS. 1 and 2 the synthetic paper portion 13 is secured to the part 21 of the paperboard sheet 12 in an end to end relationship by an adhesive tape 22. The back side of the lower portion 13 is partially laminated by a thin layer 32 of self-adhering polyester tape, such as one made of a Mylar film; which extends across the side to side dimension of the card 11. The tape 32 is wide enough to cover the head 41 of an arrow shaped key tag 26 die cut in the portion 13. The long cuts through the portion 13 and the tape 32 defining the key tag are separated by short bridging connectors, which may be as short as one thirty second of an inch in length. The key tag 26 has a head 41, a shank 42 and a tail 43. The die cutting process not only forms the outer edges of the tag 26 but also forms a round key tag hang opening 27 adjacent the distal end of the tail 43 and a T shaped slot in the tail 43 near the junction of the tail 43 with the shank 42, the slot consisting of a narrow channel 28 aligned with and narrower than the shank 42 and a slit 29 at one end of the channel 28 which is nearest the tail 43. The slit 29 is transverse to the channel 28 and extends laterally beyond the channel 28 in laterally opposite directions. The slit 29 is as long as the width of the shank 42 of the key tag 26 and the head 41 of the key tag 26 is wider than the length of the slit 29. In use, an ignition key is placed on the shank 42 of the key tag 26, the head 41 is passed through the channel 28 and the shank 42 is pulled into the slit 29. The key tag 26 with the connected ignition key can then be mounted on a locator or call board by hooking the hang opening 27 on a peg or hook on the call board. By forming the key tag 26 of a layer of the synthetic paper portion 13 and a layer of Mylar tape 32, the key tag 26 is rendered stronger to resist tearing and retains strength when wet. FIG. 1 shows the key tag 26 with its Mylar reinforcement tape 32 partially removed from the lower segment 19.

Figure 3:
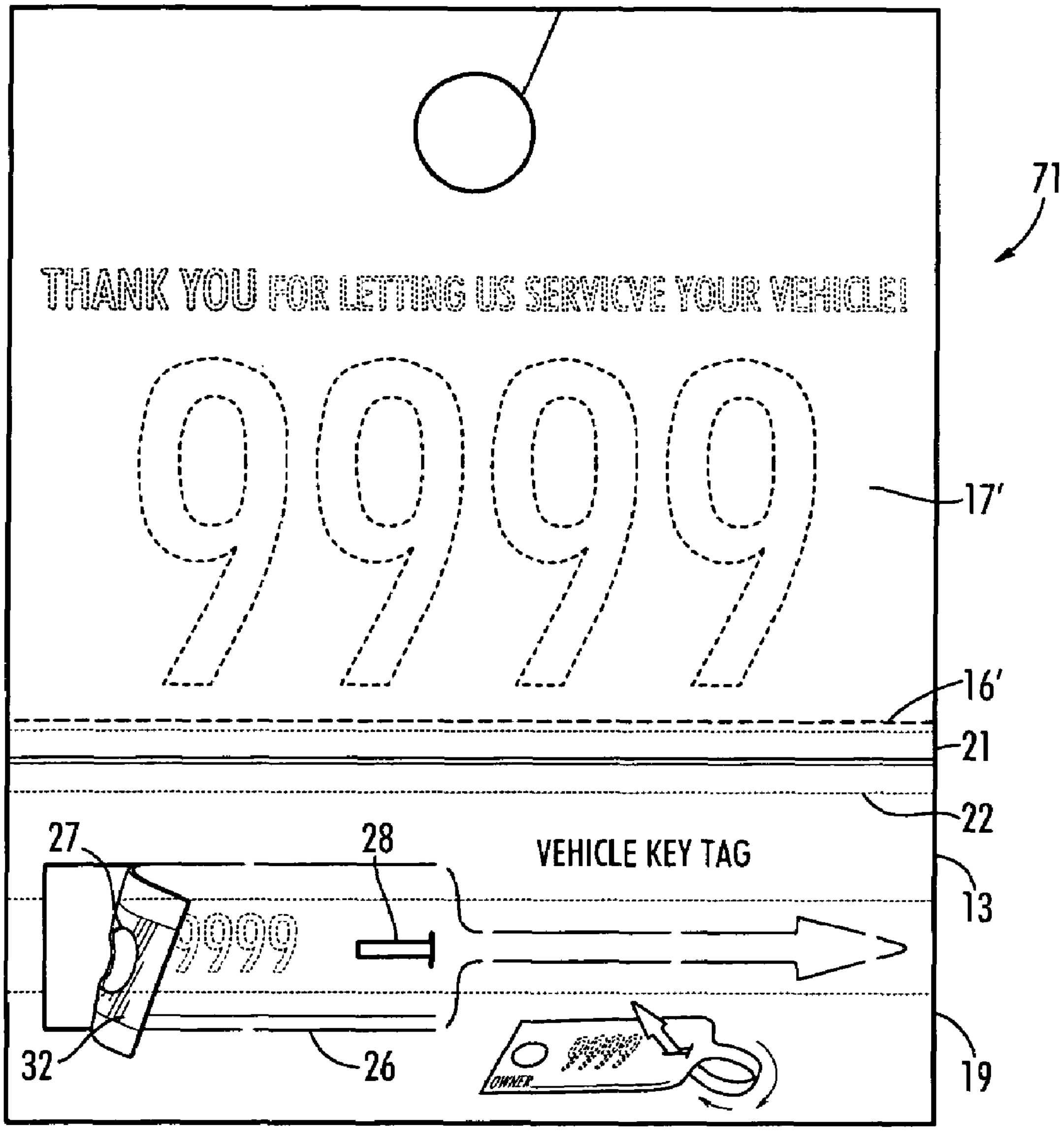
FIG. 3 is a front view of a second embodiment of a vehicle locator and identification card.
Figure 4:
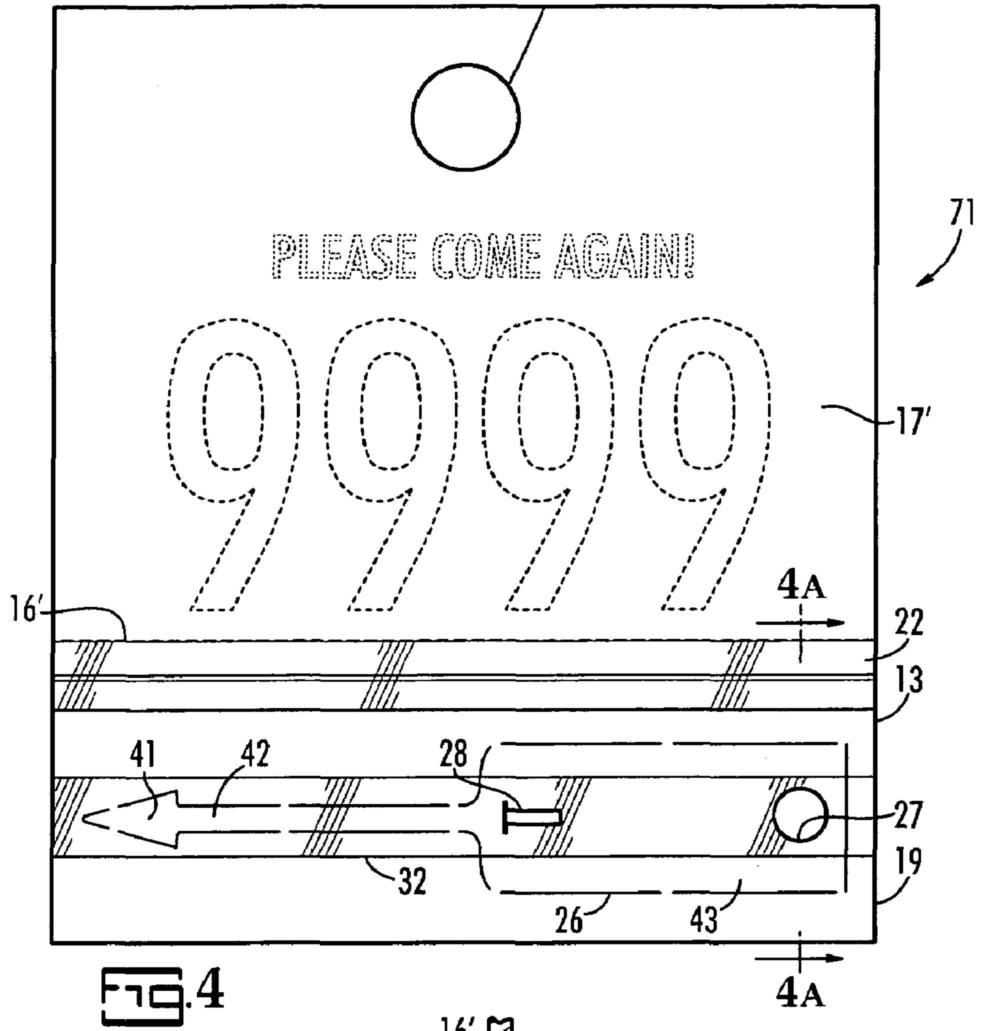
FIG. 4 is a rear view of the card shown in FIG. 3.
Figure 4A:
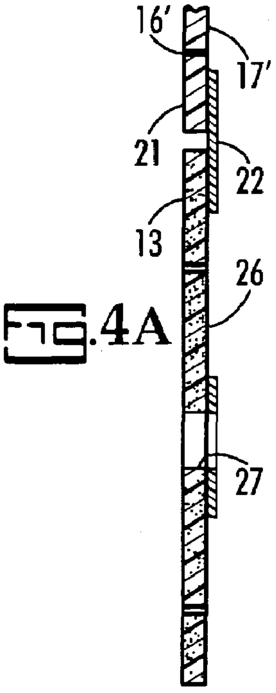
FIG. 4A is an enlarged section taken on line 4A-4A in FIG. 4.

FIGS. 3, 4 and 4A illustrate an embodiment of the invention similar to that shown in FIGS. 1 and 2 except the service card 71 has no middle section and the top to bottom length of the upper segment 17' is reduced in top to bottom length as compared to the upper segment 17 of the card 11. The construction of the lower portion 13 below the perforations 16' is the same as that of the lower portion 13 shown in FIGS. 1 and 2. FIG. 3 shows the key tag 26 partially removed from the lower portion. FIG. 4A shows the adhesive tape 22 connecting the back side of the portion 21 and to the back side of the portion 13. It also shows the Mylar tape adhered to the back side of the synthetic paperboard portion 13.

Figure 5:
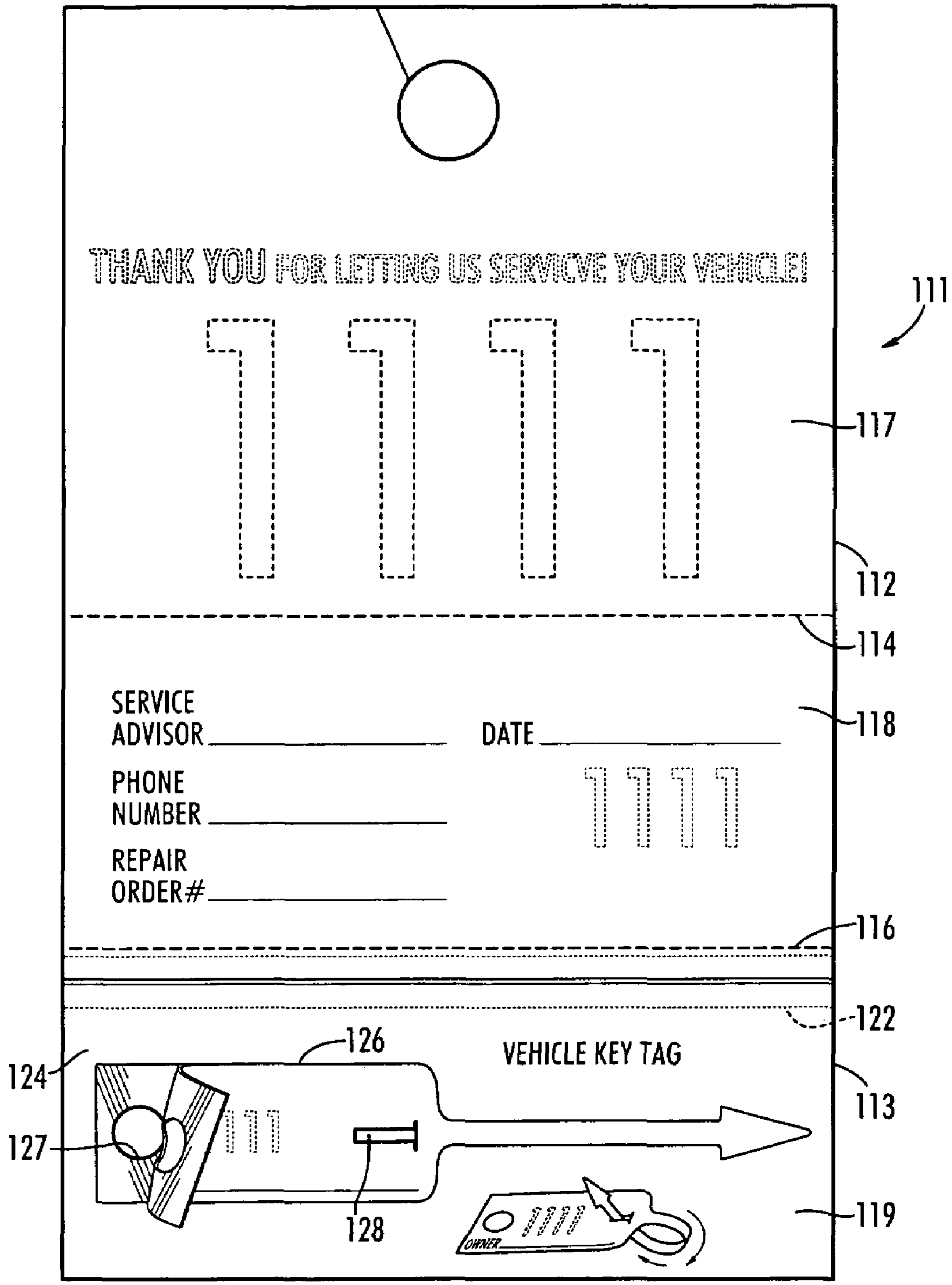
FIG. 5 is a front view of a third embodiment of a vehicle locator and identification card.
Figure 6:
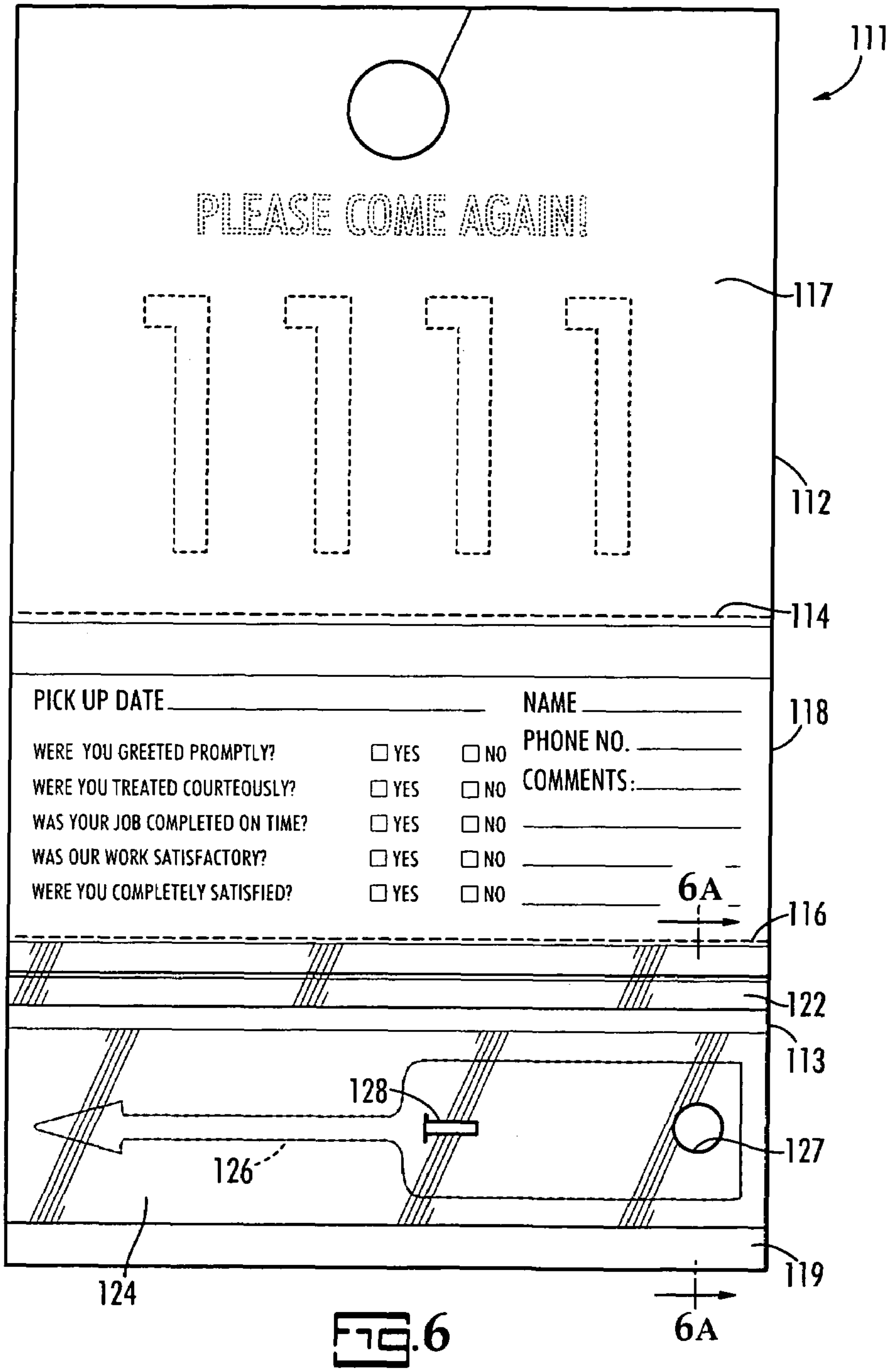
FIG. 6 is a rear view of the card shown in FIG. 5.
Figure 6A:
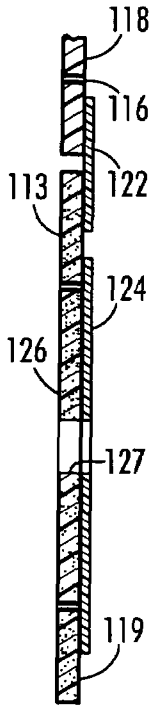
FIG. 6A is a section taken on the line 6A-6A in FIG. 6.

Referring to FIGS. 5, 6 and 6A, a service hang tag 111 includes an upper portion 112 made of pliable paperboard material connected to a lower synthetic paper portion 113 by an adhesive tape 122. Perforations 114 and 116 separate the tag 111 into an upper segment 117, an intermediate segment 118 and a lower key tag segment 119. As shown in FIGS. 6 and 6A a wide dry release laminate patch 124 is applied to the back side of the synthetic paper portion 113 of the lower segment 119. The dry release patch 124 may be formed of DLC 050, a Lite Lift Dry product of Strata-Tac Inc. of Batania, Ill., USA, which has a 2 mil thickness. The patch 124 extends across the width of the card 111 and is wide enough to cover a key tag 126, which is formed by an uninterrupted die cut through only the synthetic paper 113, thereby forming the full outline of the key tag 126. The key tag 126 is easily removed from the dry release tape 124 as partly shown in FIG. 5. A round opening 127 and a slot 128 are die cut through both the synthetic paper portion 113 and the dry release tape 124. This embodiment of the invention is a moderate cost key tag which retains appreciable strength even when wet. The key tag 26 of FIGS. 1, 2, 3, 4 and 4A also retain its strength when wet and is somewhat stronger than key tag 126 because of its Mylar laminate backing.

What is claimed is:

1. A vehicle locator card, comprising:

an upper portion formed of a sheet of paperboard, a lower portion formed of synthetic paper made of polypropylene film reinforced with fillers and including an uninterrupted cut in said synthetic paper forming the full outline of an arrow shaped key tag having an arrow shaped head, a shank and a tail, a cut through said synthetic paper forming a round hang hole in the distal end of said tail, cuts in said a tail near its junction with said shank creating a T-shaped slot formed by a channel aligned with and narrower than said shank and a slit at the end of the channel nearest to said head for receiving said shank when said head of said arrow is inserted through said channel, said channel being narrower than the width of said shank and said slit being as long as the width of said shank, a dry release laminate patch on one side of said lower portion covering one side of said key tag, and a tape securing said lower portion to said upper portion in an end to end relationship, said upper portion and said key tag carrying the same identification number.

* * * * *